July 23, 1957 N. O. H. SIDENMARK ET AL 2,800,523
DEVICE FOR PRESSURE-TIGHT END SEALING OF CABLES
Filed Oct. 21, 1953

INVENTORS
NILS OLOF HJALMAR SIDENMARK
SUNE SIGURD SIXTEN HASSELBOHM
BY
ATTORNEY

United States Patent Office 2,800,523
Patented July 23, 1957

2,800,523

DEVICE FOR PRESSURE-TIGHT END SEALING OF CABLES

Nils Olof Hjalmar Sidenmark, Danderyd, and Sune Sigurd Sixten Hasselbohm, Hagersten, Sweden, assignors to Telefonaktiebolaget L M Ericsson, Stockholm, Sweden, a corporation of Sweden Application October 21, 1953, Serial No. 387,484

Claims priority, application Sweden November 4, 1952

2 Claims. (Cl. 174—77)

Cables for, among others, use in telephone installations usually consist of paper insulated conductors, which form the cable core. Said core is wound with cotton tape, which is enveloped by a lead sheath. The method heretofore used to seal the end of such cables has been the following: the cable is introduced into a cable box through an inlet tube, whereafter the cable sheath is soldered to said inlet tube. The cable box is provided on its front with blocks provided outwardly with connecting screws and inwardly with soldering tabs. Each separate conductor is then soldered within the box to said soldering tabs. The connecting box is thereafter filled with cable compound; sometimes the compound is poured only onto the cable from which it penetrates into the inlet tube. The box is thereafter closed by means of a lid applied to the back of the box, which lid is then either screw-fastened, using an intermediate tightening packing, or else soldered round the edge of the lid. The blocks on the front of the box, which must naturally consist of an insulating material (Steatite or Bakelite), are fastened to the box by cementing or soldering, or else by screwing using an intermediate packing round the edges of the block. It is extremely difficult to obtain pressure tightness in such a cable box. The problem has become more acute due to the fact that telephone cables are on an ever increasing scale put under continuous gas pressure of about 1 atmosphere sur-pressure in order to prevent moisture from penetrating into the cables proper should the lead sheath be damaged at some point.

The aforesaid difficulty is eliminated according to the present invention, which relates to a device for pressure-tight sealing the ends of terminals of cables, and is characterized by an outer sleeve of solderable metal, which is partly filled by a plug, through which extend insulated conductors, the length of which is considerably greater than the length of the outer sleeve, and by an inner sleeve of solderable metal fitting said outer sleeve and having a length such that, when filled in the outer sleeve, it fully covers splicings between said conductors and the corresponding conductors in the cable which it is intended to seal pressure-tight at its end or terminal, said inner sleeve being soldered to the outer sleeve and the sheath of said cable.

Figure 1:
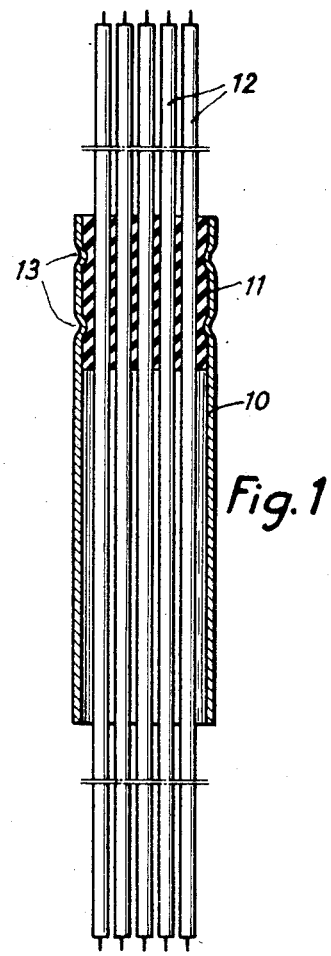
Figure 2:
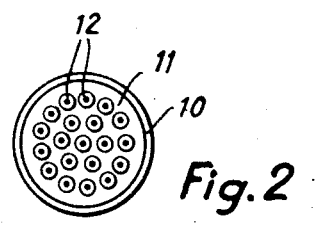
Figure 3:
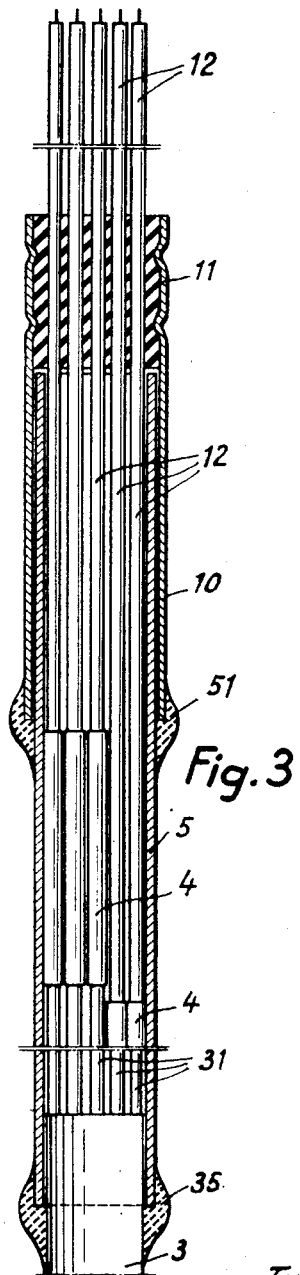

The invention will be more fully described with reference to the accompanying drawing, in which Figs. 1 and 2 show a device for end sealing of a cable, and Fig. 3 shows the device for end sealing applied to a cable.

In Fig. 1, 10 is an outer sleeve consisting of a tube of tinned brass or copper about 10 cm. long. At one end of said sleeve a sealing plug 11 is inserted, having a number of axial holes corresponding to the number of conductors comprised in the cable which are to be end sealed. The plug is made of a semi-hard, insulating material, for example neoprene, or of a thermoplastic, for example polyethylene. Through the holes of the plug insulated conductors 12 are inserted projecting about 30–40 cm. at both ends of the sleeve. The insulation of the conductors 12 may consist of for example a coating of neoprene, or else of a suitable thermoplastic, for example polyvinylchloride or polyethylene. The rubber layer inside the neoprene coating has for an object to increase the electrical insulation. The plug 11 is made to fit absolutely tightly about the conductors 12, which is achieved by crimping the plug by means of two annular grooves 13 of the sleeve 10.

The sealing device described above is shown in Fig. 3 in application to a cable. The assembly is as follows: on a cable 3, which is to be sealed, the lead sheath is peeled off a few decimeters, whereafter each paper insulated conductor 31 of the cable is spliced with an insulated conductor 12 protruding from the outer sleeve 10. A paper sleeve 4 is pushed over each splicing. Before the splicing operation of the cable begins, a splicing tube 5 made of solderable metal is slipped upon the free end of the cable. This splicing tube constitutes an inner sleeve fitting the outer sleeve 10, and has a length such that, when telescoped into the outer sleeve, it fully covers the splicings between the conductors 12 and 31. The splicing tube 5 is soldered on one end to the lead sheath of the cable 3 at point 35 and on the other end to the outer sleeve 10 at point 51. The insertion of the splicing tube in the outer sleeve is a security measure. As is apparent, the solder point 51 is situated at the end of the outer sleeve opposite the end housing the plug 11 so that the plug 11 is protected from damage by the heat developed during the soldering operation. The sealing of the cable is now completed. It has found, that such sealing devices can sustain a pressure up to 7 to 8 atmospheres, which is several times higher than the resistance to pressure required in actual practice. The free ends of the insulated conductors 12 are thereafter connected to some simple distribution block of a known kind. As a result a pressure-tight cable box is no longer needed. If the distribution block is to be placed out doors or at some place exposed to weather, it should naturally be protected by some protecting casing.

It is obvious, that several other embodiments can be devised, without the scope of the invention being departed from. The number of conductors 12 in the plug 11 need not correspond to the number of conductors in the cable 3, and therefore one and the same end sealing device can be used for cables with different numbers of conductors, but having generally the same outer diameter. Thus a 32-wire cable can for example be sealed with a plug having 40 conductors, in which case the 8 superfluous conductors (12) may remain unspliced to maintain the tightening through the plug.

When producing the described device it may be suitable to vulcanize together plug 11 and the insulated conductors 12 extending through said plug before the plug is fitted in and squeezed in the outer sleeve 10. The insulated conductors 12 are thereby prevented from being easily drawn out of the plug 11, which would be possible when the plug is only squeezed after the conductors have been inserted in their respective holes.

In order to obtain a better result regarding said vulcanizing of the conductors 12 with the plug 11, it may be suitable to pre-vulcanize the insulated conductors 12 or the plug 11, or else as well the conductors as the plug before they are vulcanized together.

We claim:

1. An assembly of a metal sheathed multiwire cable and a pressure tight cable connector comprising an outer sleeve of solderable metal, a sealing plug made of a compressible pressure tight insulation material and having a plurality of axial holes fitted in one end of said sleeve with a pressure tight fit, conductors insulated with an insulation material similar to that of said plug extending through each of said holes with a pressure tight fit, said conductors protruding from the open end of said sleeve and being connected with their protruding parts to the wire ends of said cable, an inner sleeve made of solderable metal and telescoped into said outer sleeve and upon the sheathing of said cable, said inner sleeve enveloping the protruding parts of said connectors and the wire ends connected thereto, and soldering joints joining respectively the cable sheathing to the respective end of the inner sleeve and the end of the outer sleeve opposite to said plug to the juxtaposed part of the inner sleeve whereby the wire ends of the cable are connected to the conductors of said connector with a pressure tight seal.

2. An assembly according to claim 1, wherein a protective insulation sleeve is fitted upon each connection between a conductor and a wire end.

References Cited in the file of this patent

UNITED STATES PATENTS

| | | |
|---|---|---|
| 327,458 | McMackin | Sept. 29, 1885 |
| 1,740,367 | Newton | Dec. 17, 1929 |
| 2,232,872 | Seitz | Feb. 25, 1941 |
| 2,322,233 | Granger | June 22, 1943 |

FOREIGN PATENTS

| | | |
|---|---|---|
| 608,747 | Germany | Jan. 30, 1935 |
| 663,233 | Great Britain | Dec. 19, 1951 |